US010628581B2

(12) United States Patent
Prayaga et al.

(10) Patent No.: US 10,628,581 B2
(45) Date of Patent: Apr. 21, 2020

(54) SYSTEM AND METHOD FOR FORCED DATA LEAKAGE PREVENTION

(71) Applicant: Dell Products, LP, Round Rock, TX (US)

(72) Inventors: Venkata S N M Prayaga, Piscataway, NJ (US); James D. Testerman, McKinney, TX (US); Ricardo A. Ruiz, The Colony, TX (US); Jonathan N. Yanez, Allen, TX (US); Luis A. Valencia Reyes, Garland, TX (US); David Wu, Allen, TX (US)

(73) Assignee: Dell Products, LP, Round Rock, TX (US)

( * ) Notice: Subject to any disclaimer, the term of this patent is extended or adjusted under 35 U.S.C. 154(b) by 172 days.

(21) Appl. No.: 15/961,505

(22) Filed: Apr. 24, 2018

(65) Prior Publication Data

US 2019/0325131 A1 Oct. 24, 2019

(51) Int. Cl.
*G06F 21/54* (2013.01)
*G06F 21/60* (2013.01)
*H04N 1/32* (2006.01)
*G06T 1/00* (2006.01)
*G06F 9/445* (2018.01)

(52) U.S. Cl.
CPC .......... *G06F 21/54* (2013.01); *G06F 9/44526* (2013.01); *G06F 21/604* (2013.01); *G06T 1/0021* (2013.01); *H04N 1/32144* (2013.01); *G06F 2221/2107* (2013.01)

(58) Field of Classification Search
CPC .......... G06F 21/10; G06F 21/16; G06F 21/54; G06F 21/602; G06F 21/604; G06F 21/608; G06F 21/62; G06F 21/6209; G06F 2221/2107; G06F 9/44526; H04N 1/32144
See application file for complete search history.

(56) References Cited

U.S. PATENT DOCUMENTS

| 6,750,985 | B2 | 6/2004 | Rhoads | |
|---|---|---|---|---|
| 7,331,725 | B2 * | 2/2008 | Troyansky | ............ G06F 21/608 400/104 |
| 8,990,942 | B2 | 3/2015 | Thakadu | |
| 9,195,811 | B2 * | 11/2015 | Marshall | ................. G06F 21/00 |
| 9,536,101 | B1 | 1/2017 | Demov | |

(Continued)

*Primary Examiner* — Minh Dinh
(74) *Attorney, Agent, or Firm* — Prol Intellectual Property Law, PLLC; H. Kenneth Prol

(57) ABSTRACT

An information handling system operating a forced data leakage prevention system may comprise a processor executing code instructions of the forced data leakage prevention system to identify a third party application and an associated first dynamic link library address, identify a control policy associated with the third party application and the identified user, wherein the control policy includes a subset of code instructions associated with a secure data set, identify a call to execute code instructions stored at the first dynamic link library address, move the code instructions stored at the first dynamic link library into a second library prior to execution, inject the subset of code instructions into the code instructions stored in the second library according to the control policy, and move the code instructions stored in the second library including the injected subset of code instructions into the first dynamic link library for execution by the processor.

20 Claims, 5 Drawing Sheets

(56) References Cited

U.S. PATENT DOCUMENTS

| | | |
|---|---|---|
| 2006/0193492 A1 | 8/2006 | Kuzmich |
| 2010/0175104 A1 | 7/2010 | Khalid |
| 2014/0304505 A1* | 10/2014 | Dawson ............. G06F 21/6227 713/165 |
| 2017/0012941 A1 | 1/2017 | Subbarayan |

* cited by examiner

SYSTEM AND METHOD FOR FORCED DATA LEAKAGE PREVENTION

FIELD OF THE DISCLOSURE

The present disclosure generally relates to information handling systems, and more particularly relates to data leakage prevention. Embodiments of the present disclosure may forcibly apply methods to disallow, limit access, or share secure data in general from third-party applications and prevent scenarios where the secure data could be leaked into unsecured third party applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include data protection capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
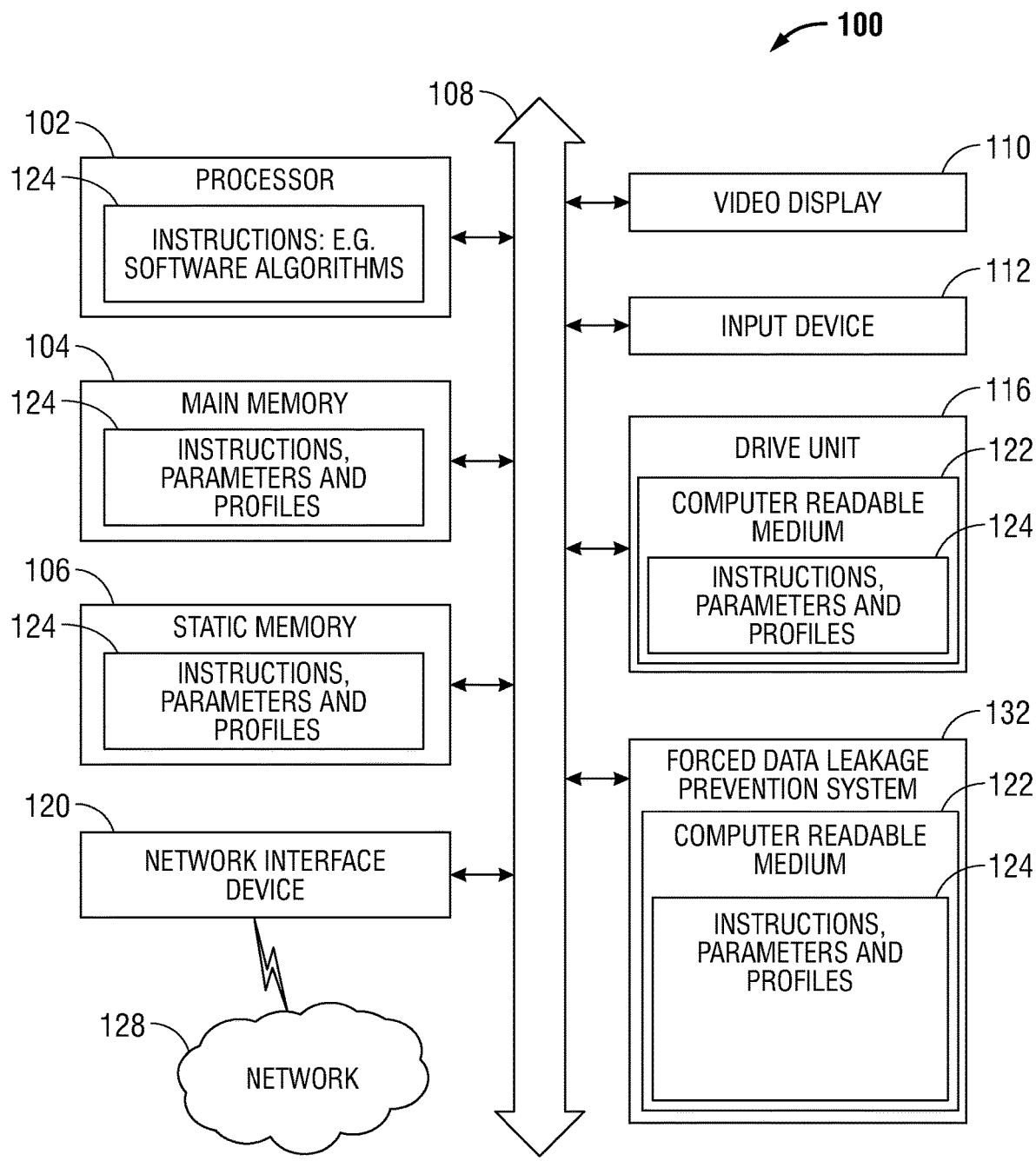
FIG. 1 illustrates a generalized embodiment of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the workforce has also grown increasingly mobile. Organizations are enabling more anytime, anywhere workforces to increase worker flexibility and productivity. To be productive, many employees are using a wide variety of devices, from desktop computers and laptops to smartphones and tablets. They are also using external devices and cloud services to share sensitive and confidential business information across devices and among employees as part of increasingly collaborative work models. As such, critical business data can be anywhere and everywhere, inevitable increasing the risk of data leakage to non-secured locations or entities.

There is a need for an approach to data protection that will safeguard data wherever it is and wherever it goes, however it is shared. Critical business data needs to be protected from the moment it is created on desktops, laptops, tablets and smartphones, and must persist when in motion and accessed across a wide range of devices and networks. Such data must also be protected when in use by all third party applications running on each device or within each network, such as files shared with personal email accounts or cloud-based collaboration services. Through all of this data movement, there is a further need to monitor who is accessing the data and to adaptively revoke access of specific individuals or access by specific third party applications if necessary.

One current solution to restricting access of third party applications to sensitive data is development of a plugin for each third party application. As third party applications are developed at an increasingly fast pace, this solution becomes increasingly cumbersome and impractical to employ. An approach that can restrict access to third party applications without development of a specific plugin for each application is needed. Embodiments of the present disclosure address this issue by employing forced data leakage prevention system to intercept operating system messages generated when operations are performed by any supported third party application, and to then limit the ways in which such operations are performed on sensitive or secure business data. In such a way, the forced data leakage prevention system in embodiments of the present disclosure may limit the ways in which secure data is shared across all devices, all registered users, and by any current or later-developed third party application, regardless of which third party application attempts to manipulate the secure data.

In embodiments of the present disclosure, individual files may be encrypted or otherwise identified as "secure," and control policies defining who can access such data, when such data may be accessed, and how it may be manipulated can be stored in a central location, such as a policy server machine. The policy server machine in embodiments may be in communication via a network with a plurality of client machines, such as centralized business servers, employee desktop information handling systems, mobile information handling systems, and smart phone information handling systems. Each of these client machines may further be remotely located from one another, allowing for more anytime, anywhere workforces to increase worker flexibility and productivity.

In embodiments of the present disclosure, each client machine may further include a forced data leakage prevention system operating within an injection client module to control which third party applications on the client machine may access and manipulate secure data residing in a memory of the client device, based on the control policies associated with that secure data. The injection client in embodiments may retrieve the control policies associated with secure data stored in memory from the remotely located policy server machine via a privileged user mode service operating onboard the client machine. Each control policy in embodiments may define one or more third party applications (e.g. by name or by dynamic link library address) the forced data leakage prevention system should monitor and to which secure data access should be restricted or disallowed. The injection client in embodiments may then monitor operating systems messages between the processor onboard the client machine and the third party application requesting the processor perform an operation on behalf of the third party application. Such operating system messages in embodiments may provide a call to execute code instructions residing in a dynamic link library of the third party application at a given address. By intercepting these messages and accessing the code residing at the given address, the injection client may determine when the code instructions of the third party application are attempting to perform an operation on the secured data.

Upon determination that a third party application identified in a control policy as requiring restrictions to secure data access is attempting to access and/or manipulate the secure data, the forced data leakage prevention system in embodiments of the present disclosure may modify the code instructions of the third party application prior to execution by the processor, in order to restrict access to the secured data, and/or restrict the ways in which the third party application may manipulate the data. For example, in embodiments of the present disclosure, the forced data leakage prevention system may interject a subset of code instructions into the code instructions of the third party application in order to disallow execution of the operation requested by the third party application (e.g. copying and pasting of secure data into an unsecure document, and/or printing of secure data), automatically encrypt previously unencrypted data upon copy and paste of the data, and/or apply a digital watermark identifying the user and third party application accessing the secure data to printouts of the secure data. Printing as described herein may include but may not be limited to printing to hardcopy paper via an external printing device, and electronically transforming data from one format to another.

The control policy associated with the secure data may define which of these actions to take, based on the type of data being accessed, the user requesting access, and whether the third party application is identified as "supported," or "unsupported," as preset by an IT professional within the business enterprise. The control policies associated with each item of secure data may be managed remotely from the client devices by such an IT professional and located centrally within the enterprise. As such, as new third party applications are developed and are downloaded onto remotely located client devices, such an IT professional may instruct the forced data leakage prevention system to monitor and control access by these third party applications simply by adding the name of such newly-developed third party application to the list associated with one or more items of secure data within one or more control policies of third party applications requiring monitoring and secure data access restrictions. In such a way, the forced data leakage prevention system in embodiments of the present disclosure may control access to individual items of secure data across by any current or later-developed third party application, regardless of which third party application attempts to manipulate the secure data, without development of a specific plugin for each third party application.

Examples are set forth below with respect to particular aspects of an information handling system for operating a forced data leakage prevention system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the forced data leakage prevention system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, or a solid state display. Additionally, the information handling system 100 may include an alpha numeric input device 112, such as a keyboard, and/or a cursor control device, such as a mouse, touchpad, or gesture or touch screen input. The information handling system 100 can also include a disk drive unit 116. The processor 102 in an embodiment may operate to execute the forced data leakage prevention system 132, and to store one or more profiles 124 defining control policies.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The information handling system 100 can include a set of instructions 124 that can be executed to cause the computer system to perform any one or more of the methods or computer based functions disclosed herein. For example, instructions 124 may execute a forced data leakage prevention system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the forced data leakage prevention system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the forced data leakage prevention system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the forced data leakage prevention system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The forced data leakage prevention system 132 and the drive unit 116 may include a computer-readable medium 122 such as a static memory, or a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a forced data leakage prevention system 132 that may be operably connected to the bus 108. The forced data leakage prevention system 132 computer readable medium 122 may also contain space for data storage. The forced data leakage prevention system 132 may perform tasks related to controlling whether and the ways in which third party applications may access and/or manipulate secured data within an enterprise network.

In an embodiment, the forced data leakage prevention system 132 executed by the processor 102 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
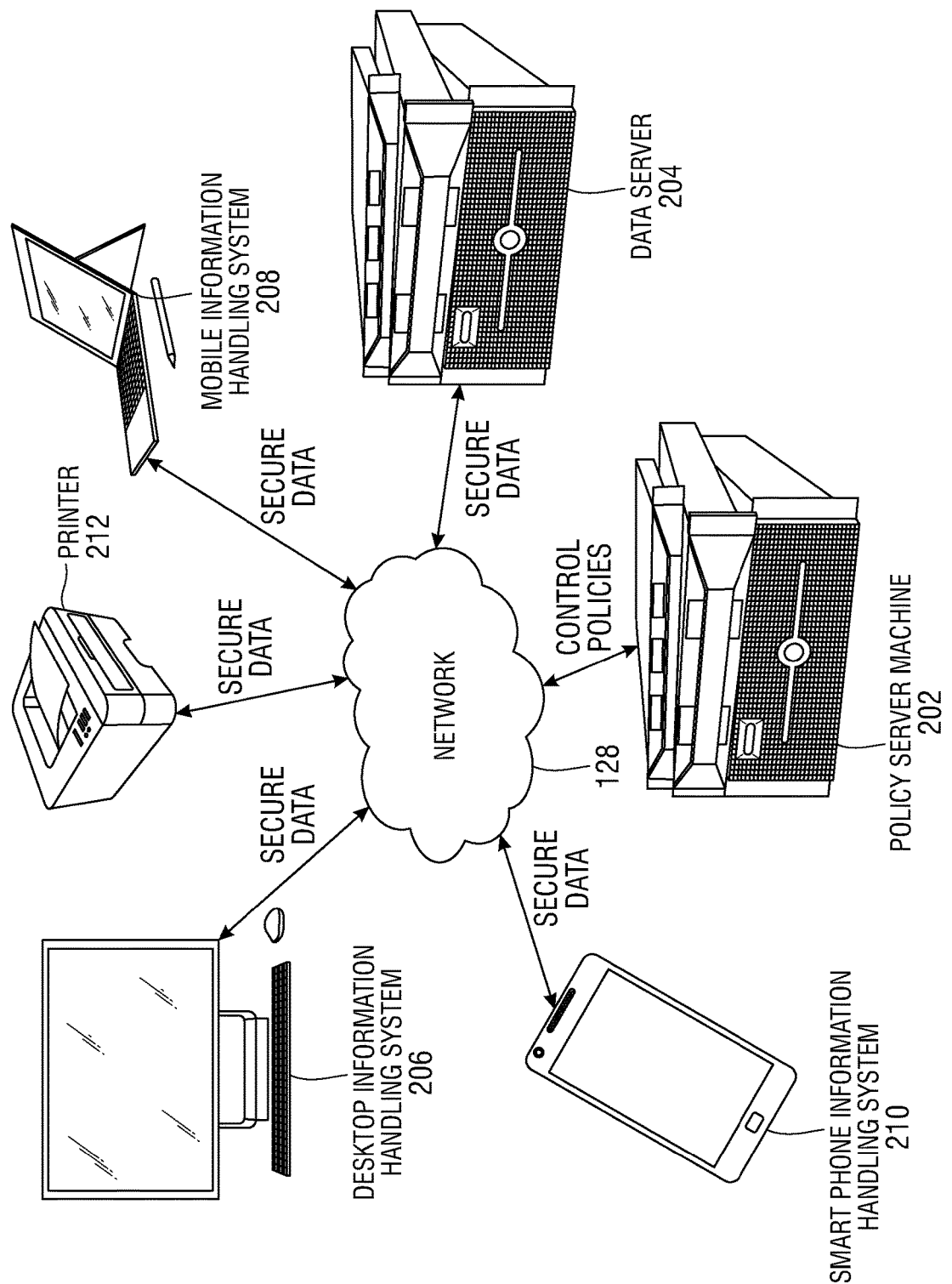
FIG. 2 is a block diagram illustrating an enterprise network across which secure business data may be shared according to an embodiment of the present disclosure.

FIG. 2 is a block diagram illustrating an enterprise network across which secure business data may be shared among a plurality of information handling systems and centralized servers, which are also capable of locally storing secure data, according to an embodiment of the present disclosure. As the workforce grows increasingly mobile, employees are using a wide variety of devices, from desktop computers and laptops to smartphones and tablets. They are also using external devices and cloud services to print and share sensitive and confidential business information across devices and among employees as part of increasingly collaborative work models. As such, critical business data can be anywhere and everywhere, inevitable increasing the risk of data leakage to non-secured locations or entities. For example, as shown in FIG. 2, secure data may be stored in an embodiment at a centralized data server 204, and/or may be shared across network 128 with a plurality of employee information handling systems, including but not limited to desktop information handling systems 206, mobile information handling systems 208, smart phone information handling systems 210, and printer 212. These are only examples of information handling systems capable of accessing secure data across the network 128, and other embodiments may include any type of current or future-developed information handling system capable of accessing data across a wired or wireless network. In yet other embodiments, secure data may be stored locally at the data server 204, the desktop information handling system 206, the mobile information handling system 208, and/or the smart phone information handling system 210.

The secure data stored locally or shared across the network 128 and across information handling systems 206-210 in an embodiment needs to be protected from the moment it is created on any of the information handling systems 206-210, and must persist when in motion and/or accessed by any of the information handling systems 206-210. For example, secure data created at desktop information handling system 206 needs to be protected across all information handling systems 206-210 and at the data server 204. Data may be "secured" by application of one of a plurality of different protection levels upon creation of the data. Different documents having the same format (e.g. Microsoft Word .doc) may have differing levels of protection, and documents having differing formats (e.g. Microsoft word .doc and Microsoft Excel .xls files) may have differing protection levels. Further, different portions of data within the same document or file may have differing levels of protection. For example, a first portion of a Microsoft word document may be encrypted while another portion of the same Microsoft word document may be unencrypted. Each of these distinctions may be outlined in a control policy associated with the Microsoft word document in such an example embodiment.

The data server 204 in an embodiment may serve as a centrally located storage server accessible by all employees within an enterprise according to predefined security parameters. In other embodiments, the data server 204 may not be included, and all secure data may be stored in memories onboard one or more of information handling systems 206-210 only. Such secure data must also be protected when in use by all third party applications running on each information handling system 206-210 or being shared across all networks including but not limited to network 128. Secure data in an embodiment may include but may not be limited to files stored in a memory onboard information handling systems 206-210, and files shared with personal email accounts or cloud-based collaboration services.

Upon creation of a secure data file, item, or document, a control policy identifying who can access the secure data file, when the data can be accessed, and the ways in which the data may be permissibly manipulated (e.g. copy/paste, print) may be created and associated with the secure data file in a memory of a policy server machine 202. In an embodiment, the policy server machine 202 may be accessible via network 128 by the data server 204, and each of the information handling systems 206-210. By accessing and executing code instructions within such a control policy associated with the secure data transmitted to any of the information handling systems 206-210 via network 128, each of the information handling systems 206-210 in an embodiment may monitor who is accessing the data and to adaptively revoke access of specific individuals or access by specific third party applications operating onboard any of the information handling systems 206-210, if necessary. In such a way, the forced data leakage prevention system in embodiments of the present disclosure may limit the ways in which secure data is shared across all devices, all printers, all registered users, and by any current or later-developed third party application, regardless of which third party application attempts to manipulate the secure data.

Figure 3:
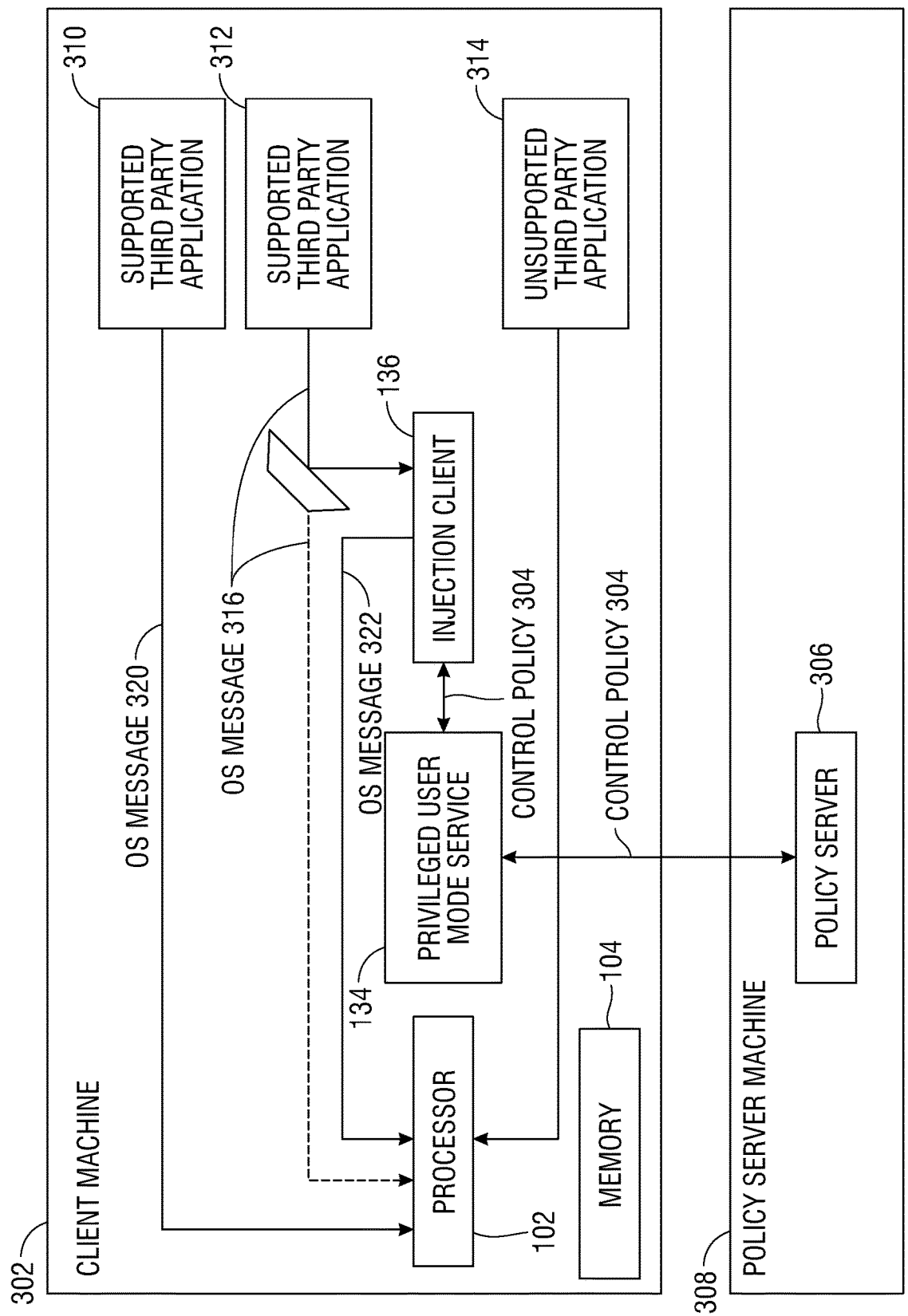
FIG. 3 is a block diagram illustrating an injection client module executing code instructions of a forced data leakage prevention system according to an embodiment of the present disclosure.

FIG. 3 is a block diagram illustrating an injection client module onboard a client machine located remotely from a centralized data server executing code instructions of a forced data leakage prevention system according to an embodiment of the present disclosure. Secure data must be protected when in use by all third party applications running on each device or within each network, such as files shared with personal email accounts or cloud-based collaboration services. For example, secure data must be protected at each information handling system, such as client machine 302, used by each employee within an enterprise. Client machine 302 may include, but may not be limited to the data server, desktop information handling system, mobile information handling system, smart phone information handling system, or any future-developed information handling system capable of accessing data across a network as described above. Each client machine 302 in an embodiment may include a memory 104 for storage of secure data, and a processor 102 executing code instructions of a privileged user mode service 134, and an injection client 136.

The injection client 136 in an embodiment may operate to execute code instructions of a forced data leakage prevention system in order to control which third party applications on the client machine 302 may access and manipulate secure data residing in memory 104 of the client device 302, based on the control policies 304 associated with that secure data. The injection client 136 in embodiments may retrieve the control policies 304 associated with secure data stored in the policy server 306 from the remotely located policy server machine 308. In embodiments, the privileged user mode service 134 may retrieve one or more control policies 304 from the policy server 306 and deliver those control policies 304 to the injection client 136.

The processor 102 in an embodiment may further execute code instructions of one or more third party applications, including but not limited to supported third party application 310, supported third party application 312, and unsupported third party application 314. Each control policy 304 in embodiments may define one or more of these third party applications 310-314 (e.g. by name or by dynamic link library address) the injection client 136 should monitor and to which secure data access should be restricted or disallowed. For example, a control policy 304 in an embodiment may identify supported third party application 312 as an application the injection client 136 should monitor and to which secure data access should be restricted or disallowed. In such an example embodiment, the control policy 304 may not direct the injection client 136 to monitor or alter instructions of supported third party application 310.

The injection client 136 in such an embodiment may then monitor and intercept operating systems (OS) messages 316 transmitted from the processor 102 onboard the client machine 302 and the supported third party application 312 requesting the processor 102 perform an operation on behalf of the third party application 312. In contrast, because the control policy did not identify supported third party application 310 in such an example embodiment, the injection client 136 may not monitor or intercept delivery of OS messages 320 to the processor 102 from supported third party application 310, as indicated by the continuous line shown in FIG. 2.

Each of the OS messages may include a call to execute code instructions stored at a dynamic link library associated with a third party application. For example, OS message 316 in an embodiment may include a call to execute code instructions stored at a dynamic link library (DLL) stored at memory 104 and associated with supported third party application 312. When the processor 102 receives such a call instruction, the instruction is placed in a process stack for later execution.

Upon interception of the OS message 316, the injection client 136 may move the code instructions located at the address identified in the call instructions to another address prior to execution of the code instructions by the processor 102. For example, the injection client 316 may move the code instructions located at the DLL address associated with the supported third party application 312 to another location within memory 104 before the processor 102 reaches the call instruction to execute that code in the process stack. In such a way, once the processor 102 reaches the call instruction within the process stack and attempts to execute the code instructions stored at the DLL address given in the call instruction, the code instructions will no longer be stored there, and the processor will not be able to execute the code instructions. In some embodiments, the processor 102 may respond to such a scenario by placing the call instruction back into the stack for later execution. In other embodiments, the processor 102 may retry execution until the code instructions can be located. In still other embodiments, the processor 102 may simply terminate all attempts to execute the call instruction.

Upon moving the code instructions to another location within the memory 104, the injection client 136 in an embodiment may inspect the code instructions to determine whether the code instructions call for access and/or manipulation of the secure data associated with control policy 304. As described herein, each control policy 304 may define which types of actions one or more identified third party applications may take upon a given set of secure data. The injection client 136 in an embodiment may be capable of identifying whether one or more of the third party applications identified in the control policy 304 is attempting to take one of the types of actions identified in the control policy 304 through such analysis of the code instructions moved from the DLL address. In an embodiment, control policy 304 may further include subsets of code instructions, and each subset of code instructions may be associated with such identified types of actions. For example, control policy 304 identifying supported third party application 312 as an application to monitor in an embodiment may include a subset of code instructions operating to apply a digital watermark to all printouts of the secure data, and that subset of code instructions may be associated with a print command. Such a digital watermark may be irrevocable in some embodiments. A print command, or printing as described herein may include but may not be limited to printing to hardcopy paper via an external printing device, and electronically transforming data from one format to another. Examples of electronically transforming data from one format to another (e.g. printing to soft copy) may include but may not be limited to transforming a document from a Microsoft Word® format to an Adobe® pdf format, transforming a Microsoft Paint® file to a JPEG format, and performing a "screen grab" operation to generate a JPEG file depicting the current display screen contents.

In such an example embodiment, if the injection client 136 identifies a print command associated with the secured data within the code instructions the supported third party application 312 requested (in OS message 316) that the processor 102 execute, the injection client 136 may retrieve the code instructions operating to apply a digital watermark to all printouts of the secure data from the control policy 304.

If the injection client 136 in an embodiment identifies an action within the code instructions the injection client 136 has moved and analyzed prior to execution, and such action is associated within the control policy 304 with a subset of code instructions, the injection client 136 may inject the subset of code instructions from the control policy 304 into the code instructions the injection client 136 has moved and analyzed prior to execution. For example, if the injection client 136 in an embodiment identifies a print command associated with the secure data within the code instructions the injection client 136 has moved and analyzed, and the control policy 304 associated a print command with a subset of code instructions operating to apply a digital watermark, as described directly above, the injection client 136 may inject the subset of code instructions operating to apply a digital watermark into the code instructions including the print command. The digital watermark may be applied to only a portion of the document associated with the print command in some embodiments, such that only the portion of the document including the secure data prints with a digital watermark. This is only one example of injecting a subset of code instructions, and further embodiments are described in greater detail herein.

In other embodiments, the injection client 136 may not identify an action within the code instructions the injection client 136 has moved and analyzed prior to execution that is associated within the control policy 304 with a subset of code instructions. This may occur, for example, if the code instructions the injection client 136 has moved and analyzed prior to execution does not include any actions identified in the control policy 304 (e.g. print command), or if an action identified in the control policy 304 (e.g. print command) is not operating on the secure data, but rather, on unrelated data. In such embodiments, the injection client 136 may not inject any subset of code instructions given in the control policy 304, and may leave the code instructions the injection client 136 moved prior to execution in the original form in which they were stored in the DLL associated with the supported third party application 312.

Once the injection client 136 has injected the subset of code instructions from the control policy 304 into the code instructions the injection client 136 has moved prior to execution, the processor 102 may be prompted to execute the code instructions, including the injected subset of code instructions from the control policy 304. The processor 102 may be prompted to perform such an execution in a plurality of ways in various embodiments. In one embodiment, following injection of the subset of code instructions, the injection client 136 may move the code instructions, including the injected subset of code instructions back to the DLL associated with the third party application that issued the original call instruction to the processor 102. In such an embodiment, the processor 102 may then perform the call instruction to execute the code instructions located at the DLL address identified in the call instruction, and consequently execute the code instructions including the injected subset of code instructions, as stored at the DLL address by the injection client 136 following injection of the subset of code instructions. Such an approach may be used if the processor 102 has not yet reached the original OS message 316 including the call instruction within the process stack, if the processor has placed the call instruction lower in the process stack following a failed attempt to execute, or if the processor 102 is currently retrying execution of the call instruction.

For example, the injection client 136 may inject a subset of code instructions operating to apply a digital watermark to any printouts of the secure data to a code instruction from the supported third party application 312 to printout the secure data, then move the full code instruction including the subset of code instructions to apply a digital watermark back to the DLL address associated with the supported third party application 312. In such an embodiment, when the processor 102 executes the call instruction to execute code located at the DLL address associated with the supported third party application 312, it will execute both the command to print the secured data and the command to apply a digital watermark to such a printout.

As another example of the same embodiment, if the injection client 136 did not identify an action within the code instructions that is associated within the control policy 304 with a subset of code instructions (e.g. the code instructions included a command to print data other than the secured data), the injection client 136 may move the code instructions back to the DLL address associated with the supported third party application 312 without modification. In such an embodiment, when the processor 102 executes the call instruction to execute code located at the DLL address associated with the supported third party application 312, it will execute the code instructions as originally intended by the supported third party application 312, and will allow the printing of the non-secured data without limitation.

In another embodiment, following injection of the subset of code instructions, the injection client 136 may issue an OS message 322 including a separate call instruction to the processor 102 to execute the code instructions in the location within memory to which the injection client 136 has moved it (e.g. not within the DLL address associated with the third party application). In such an embodiment, the processor 102 may then perform the call instruction to execute the code instructions located at an address other than the DLL address identified in the call instruction within OS message 316, and consequently execute the code instructions including the injected subset of code instructions, as stored at the address other than the DLL address of supported third party application 312 by the injection client 136 following injection of the subset of code instructions. Such an approach may be used if the processor 102 has terminated attempts to execute the code instructions located at the DLL address associated with the supported third party application 312, as identified in the call instruction within the OS message 316.

For example, the injection client 136 may inject a subset of code instructions operating to apply a digital watermark to any printouts of the secure data to a code instruction from the supported third party application 312 to printout the secure data, then send OS message 322 to the processor 102 including a call function to execute the full code instruction including the subset of code instructions to apply a digital watermark as stored at an address other than the DLL address associated with supported third party application 312. In such an embodiment, when the processor 102 executes the call instruction to execute code located at the address other than the DLL address associated with the supported third party application 312 as identified within OS message 322, it will execute both the command to print the secured data and the command to apply a digital watermark to such a printout.

As another example of the same embodiment, if the injection client 136 did not identify an action within the code instructions that is associated within the control policy 304 with a subset of code instructions (e.g. the code instructions included a command to print data other than the secured data), the injection client 136 may send OS message 322 to the processor 102 including a call to execute the unmodified code instructions currently stored at an address other than the DLL address associated with the supported third party application 312. In such an example embodiment, the unmodified code instructions currently stored at an address other than the DLL address associated with the supported third party application 312 may be identical to the code instructions originally stored at the DLL address associated with the supported third party application 312. In such an embodiment, when the processor 102 executes the call instruction to execute code located at the address other than the DLL address associated with the supported third party application 312 (as identified in the OS message 322), it will execute the code instructions as originally intended by the supported third party application 312, and will allow the printing of the non-secured data without limitation.

In another embodiment, actions the supported third party application 312 may attempt to take may be associated within the control policy 304 with a subset of code instructions to terminate the process. In such an embodiment, when the processor 102 attempts to execute code instructions pursuant to a call function within OS message 316, the processor 102 will terminate the process prior to printout of any secure data. In contrast, a call to execute the same command included within OS message 320, as issued by the supported third party application 310 in an embodiment may result in printout of the secure data without a digital watermark, and without restrictions. Thus, the control policy 304 may provide for differing levels of access to the same secured data for different third party applications operating within a client machine 302. Further, the control policy 304 may be modified at the policy server machine 308 located remotely from the client machine 302 as new third party applications become available. In such a way, the forced data leakage prevention system of the injection client 136 in embodiments of the present disclosure may limit the ways in which secure data is shared across all devices, all registered users, and by any current or later-developed third party application, regardless of which third party application attempts to manipulate the secure data, without development of separate plugins for each third party application.

Figure 4:
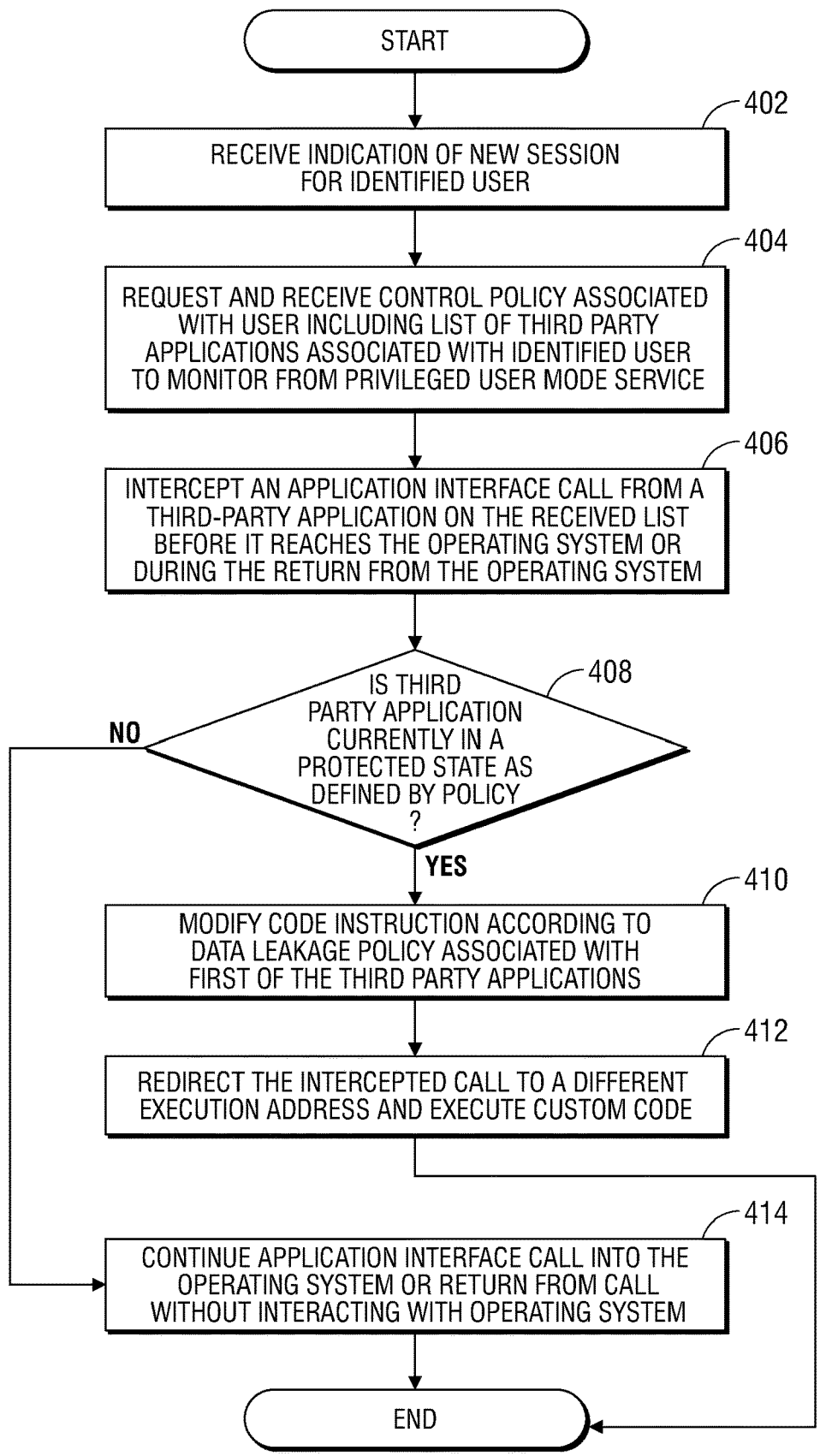
FIG. 4 is a block diagram illustrating a method of a forced data leakage prevention system to control access by third party applications to secure data according to embodiments of the present disclosure.

FIG. 4 is a block diagram illustrating a method of a forced data leakage prevention system to control access by third party applications of a client machine to secure data of an enterprise system on a case by case basis according to embodiments of the present disclosure. In embodiments of the present disclosure, each client machine may include a forced data leakage prevention system operating within an injection client module to control which third party applications on the client machine may access and manipulate secure data residing in a memory of the client device, based on the control policies associated with that secure data and the current user. At block 402, in an embodiment, the forced data leakage prevention system may receive an indication of a new session for an identified user at a client machine. Client machines may include any information handling system operated by a user within an enterprise network. For example, in an embodiment with reference to FIG. 2, a client machine could be any one of a plurality of employee information handling systems, including but not limited to desktop information handling systems 206, mobile information handling systems 208, and smart phone information handling systems 210. The forced data leakage prevention system in an embodiment may be executed within an injection client of such a client machine. For example, in an embodiment described with reference to FIG. 3, each client machine 302 in an embodiment may include an injection client 136 executing code instructions of the forced data leakage prevention system.

As described herein, each user may have differing levels of permission to access secured data. For example, a salesperson may have highly limited access to secured data such as technical specifications of a product, while the CEO or an IT director may have greater or unlimited access to all secured data within an enterprise network. As also described herein, each user may have differing levels of permission for manipulation of such secured data. For example, a salesperson may not be capable of printing any secured data to pdf, while the CEO may have unlimited access to printing capabilities. As such, the forced data leakage prevention system in an embodiment may need to retrieve freshly updated control policy defining such access each time a new user session begins.

At block 404, in an embodiment, the forced data leakage prevention system may request and receive a control policy associated with the identified user, including a list of third party applications associated with the identified user to monitor from the privileged user mode service. The control policy in an embodiment may associate each third party application listed with differing levels of permission to manipulate a given set of secured data. In some embodiments, multiple control policies may be received at block 404. In such embodiments, each of the multiple control policies may be associated with the identified user, but each control policy dictates permissions for manipulation of a separate set of secure data or a separate level of protection for secure data. For example, a first control policy associated with the identified user may dictate permissions for manipulation of secure data falling within a top designation of security (e.g. data designated "confidential"), while a second control policy associated with the same identified user may dictate permissions for manipulation of secure data falling within the lowest designation of security (e.g. open source computer code). In other embodiments, each of these separate control policies could be included as separate subportions of a holistic or complete control policy, in which each user is associated with a single complete control policy.

The injection client in embodiments may retrieve the control policies associated with secure data stored in memory from the remotely located policy server machine via a privileged user mode service operating onboard the client machine. For example, in an embodiment described with reference to FIG. 3 above, the injection client 136 may retrieve the control policies 304 associated with secure data stored in the policy server 306 from the remotely located policy server machine 308, and deliver those control policies 304 to the injection client 136. Each control policy 304 in embodiments may define one or more of the third party applications 310-314 operating on the client machine 302 (e.g. by name or by dynamic link library address) the injection client 136 should monitor and to which secure data access should be restricted or disallowed. For example, a control policy 304 in an embodiment may identify supported third party application 312 and unsupported third party application 314 as applications the injection client 136 should monitor and to which secure data access should be restricted or disallowed. In such an example embodiment, the control policy 304 may not direct the injection client 136 to monitor or alter instructions of supported third party application 310.

At block 406, in an embodiment, the forced data leakage prevention system may intercept an application interface call from a third-party application on the received list before it reaches the operating system and/or during the return from the operating system. The application interface call in an embodiment may be a request for the processor to execute a code instruction. For example, in an embodiment described with reference to FIG. 3, the injection client 136 in such an embodiment may monitor and/or intercept operating systems (OS) messages 316 transmitted from the processor 102 onboard the client machine 302 and the supported third party application 312 requesting the operating system instruct the processor 102 to perform an operation on behalf of the third party application 312.

Each of the OS messages intercepted by the forced data leakage prevention system in an embodiment may include a call to execute code instructions stored at a dynamic link library associated with a third party application. For example, in an embodiment described with reference to FIG. 3, OS message 316 may include a call to execute code instructions stored at a dynamic link library (DLL) stored at memory 104 and associated with supported third party application 312. When the processor 102 receives such a call instruction, the instruction may be placed in a process stack for later execution in an embodiment.

At block 408, it may be determined whether the third party application that sent the intercepted application interface call is currently in a protected state as defined by the received control policy. The control policy received from the remote policy control server in an embodiment may provide classification of each third party application, which the forced data leakage prevention system should monitor as either in a protected state or not in a protected state. These designations may be preset prior to the beginning of each user session, and may indicate whether the third party application is known to support security measures employed and required by the security parameters of the enterprise system. Examples of third party applications not in a protected state in an embodiment may include but may not be limited to Microsoft Office programs, and Adobe pdf readers and editors. Examples of third party applications in a protected state in an embodiment may include but may not be limited to social media platforms such as Snapchat, and newly developed third party applications whose security measures are not yet known. If the third party application is in a protected state, the method may proceed to block 410. If the third party application is not supported, the method may proceed to block 414.

At block 410, in an embodiment, if the third party application is currently in a protected state, the forced data leakage prevention system may modify the code instruction identified in the intercepted application interface call according to a control policy associated with third party application. The forced data leakage prevention system in an embodiment may access the control policy received at block 404 to determine whether any actions set to execute pursuant to the code instructions are restricted or disallowed. Actions may be disallowed if they are associated with a subset of code instructions operating to terminate or block execution of such an action. Actions may be restricted in an embodiment if they are associated with a subset of code instructions operating to alter the execution of such an action, but to allow it to execute at least in part.

For example, the forced data leakage prevention system in an embodiment may determine the control policy identifies the action of accessing secure data to which the user is not allowed access as a restricted or disallowed action. As another example, the forced data leakage prevention system in an embodiment may determine the control policy identifies the action of an unsecured third party application accessing and/or modifying secure data stored on the client machine as a restricted or disallowed action. As another example, the forced data leakage prevention system in an embodiment may determine the control policy identifies the action of a third party application copying and pasting secured data into an unsecured document, as an action that is restricted or disallowed. As yet another example, the forced data leakage prevention system in an embodiment may determine the control policy identifies the action of a third party application printing secure data, and/or a third party application pasting secured data into an unencrypted secured document as an action that is restricted or disallowed.

If the control policy received at block 404 indicates any action set to execute pursuant to the code instructions are restricted are disallowed, the forced data leakage prevention system in an embodiment may modify the code instructions the intercepted application interface identifies to restrict or disallow the action as dictated by the control policy. The modified code instructions may then be stored at a location within memory that is separate from the original location identified in the intercepted application interface call.

At block 412, in an embodiment in which the third party application is currently in a protected state, the forced data leakage prevention system may redirect the intercepted call to a different execution address where a custom code set is stored within the memory of the client machine. For example, in an embodiment described with reference to FIG. 3, the injection client 136 operating the forced data leakage prevention system may redirect the intercepted OS message 316 requesting execution of code instructions located at the DLL address associated with the supported third party application 312 to another location within memory 104 where a custom code set is stored. In such an embodiment, the forced data leakage prevention system may separately instruct the processor to execute the modified code as stored at the different location. For example, the injection client 136 may issue an OS message 322 prompting the processor 102 to execute the modified code instructions in the location within memory to which the injection client 136 has stored it (e.g. not within the DLL address associated with the third party application 312). In such an embodiment, the processor 102 may then perform the call instruction to execute the code instructions located at an address other than the DLL address identified in the call instruction within OS message 316, and consequently execute the code instructions including the injected subset of code instructions, as stored at the address other than the DLL address of supported third party application 312 by the injection client 136 following injection of the subset of code instructions.

In an embodiment in which the third party application is not currently in a protected state, the application interface call may be continued into the operating system at block 414, or the forced data leakage prevention system may not interact with the operating system's execution of the code instructions referenced in the call. For example, if the supported third party application 312 in an embodiment described with reference to FIG. 3 is not currently in a protected state, according to a control policy 304, the OS message 316 may be continued on to the processor 102 for execution without modification. In such a way, the forced data leakage prevention system of the injection client 136 in embodiments of the present disclosure may limit the ways in which secure data is shared across all devices, all registered users, and by any current or later-developed third party application, regardless of which third party application attempts to manipulate the secure data, without development of separate plugins for each third party application.

Figure 5:
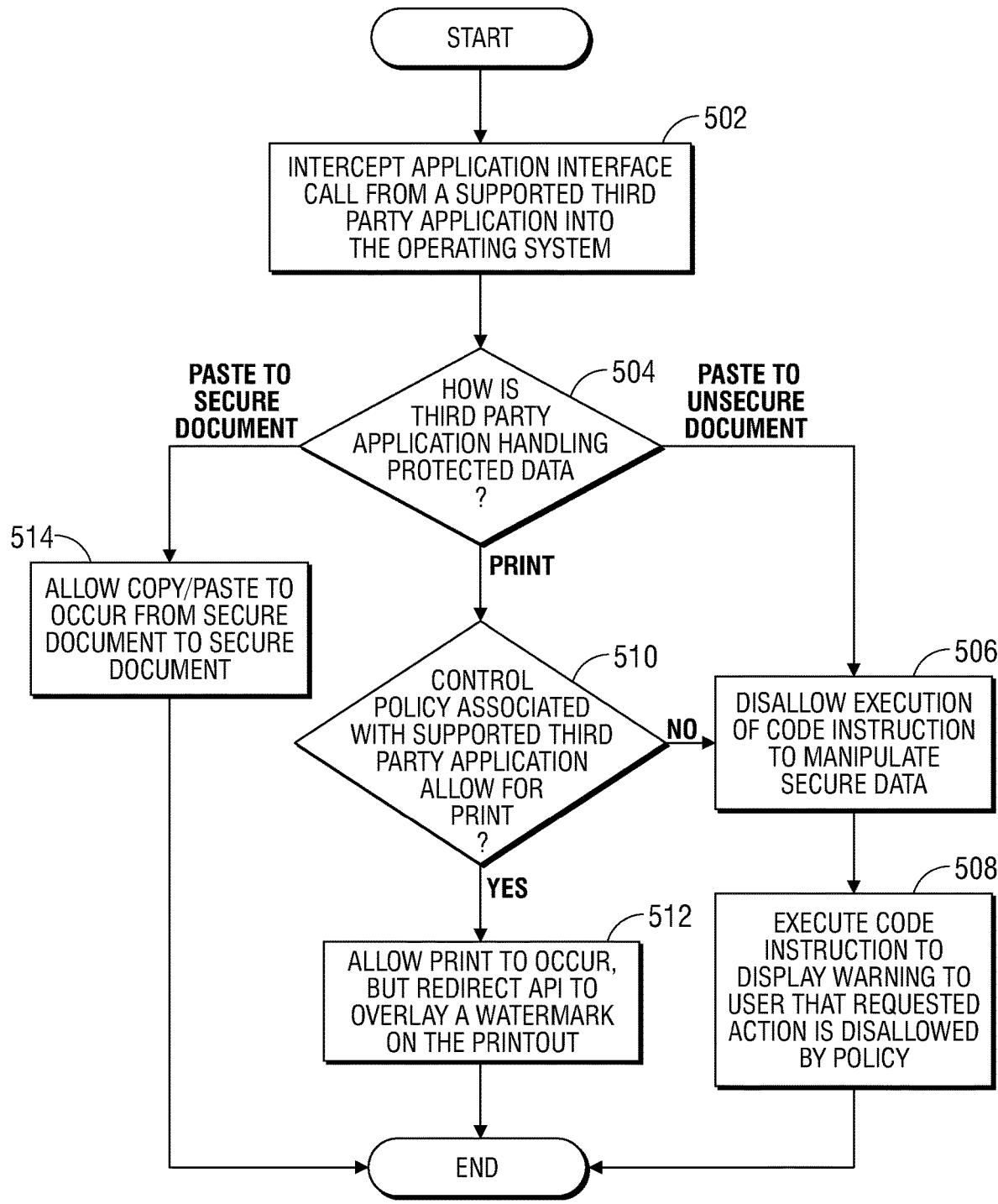
FIG. 5 is a block diagram illustrating a method of determining how to modify code instructions generated by a third party application according to an embodiment of the present disclosure.

FIG. 5 is a block diagram illustrating a method of determining whether and/or how to modify code instructions generated by a third party application to access or manipulate secured data according to an embodiment of the present disclosure. As described herein, control policies define the actions each user and each third party application may take with reference to a specific secured data item (e.g. file). The method of FIG. 5 describes one possible implementation of security measures outlined in a control policy, and other embodiments may associate the types of manipulations attempting to be made by a third party platform, as described in FIG. 5, with different responses than the ones outlined in FIG. 5.

At block 502, the forced data leakage prevention system in an embodiment may intercept an application interface call from a supported third party application into the operating system. As described herein, a forced data leakage prevention system in an embodiment may intercept a prompt from a third party application to the processor to execute a code instruction stored at a DLL address associated with the third party application. The forced data leakage prevention system may also analyze the code instructions in order to determine whether the code instructions need to be modified or disallowed according to a control policy received from and maintained at a remote policy control server.

At block 504, in an embodiment, it may be determined how the third party application is handling protected data. For example, the code instructions in an embodiment generated by a supported third party application may involve copying and pasting the secured data to either a secured or unsecured document, or printing the secured data (either to hard copy or soft copy). A print command, or printing as described herein may include but may not be limited to printing to hardcopy paper via an external printing device, and electronically transforming data from one format to another. Examples of electronically transforming data from one format to another (e.g. printing to soft copy) may include but may not be limited to transforming a document from a Microsoft Word® format to an Adobe® pdf format, transforming a Microsoft Paint® file to a JPEG format, and performing a "screen grab" operation to generate a JPEG file depicting the current display screen contents. A paste command as described herein may include pasting data from one file to another file, from one document to another document, or forwarding secure data to an unauthorized or unknown recipient via e-mail, messaging, or text.

Each of these actions may be associated in the control policy associated with the user, the secured data, and the secured third party application with a subset of code instructions with which the forced data leakage prevention system should modify the code instructions originally generated by the secured third party application. If the secured third party application in an embodiment is prompting the processor to execute code instructions to paste the secure data into an unsecure document, the method may proceed to block 506, where the forced data leakage prevention system will disallow execution of the code instructions to paste the secure data into an unsecure document, or to forward the secure data. If the secured third party application in an embodiment is prompting the processor to execute code instructions to paste the secure data into a secure document, the method may proceed to block 514. If the secured third party application in an embodiment is prompting the processor to execute code instructions to print the secure data, the method may proceed to block 510.

At block 506, if the third party application is attempting to paste secure data into an unsecure document, the forced data leakage prevention system may disallow execution of the code instruction to manipulate the secure data. The control policy in an embodiment may associate any code instruction involving pasting secure data into an unsecure document with a subset of code instructions to terminate the process. The forced data leakage prevention in such a system may then modify the code instructions by injecting the subset of code instructions associated with termination into the code instructions to paste the data into an unsecure document, causing the processor to terminate the process prior to manipulation of the secure data upon execution of the modified code. For example, in an embodiment described with reference to FIG. 3, the control policy 304 in an embodiment may associate code instructions generated by the supported third party application 312 directing the processor to copy and paste the secured data from one document into another unsecured document with a subset of code instructions to terminate the process. The forced data leakage prevention system in such an embodiment may then inject this subset of code instructions into the code instructions generated by the supported third party application 312. In such an embodiment, when the processor 102 attempts to execute code instructions pursuant to a call function within OS message 316, the processor 102 will terminate the process prior to manipulation of the secure data.

At block 508, in an embodiment in which the forced data leakage prevention system has disallowed execution of a code instruction to manipulate secure data, the forced data leakage prevention system may additionally prompt the processor to execute a code instruction to display a warning to the user that the requested action is disallowed by policy. For example, in an embodiment described with respect to FIG. 3, if the injection client 136 operating the forced data leakage prevention system has disallowed execution of a code instruction from the unsecured third party application 314 to manipulate secure data (e.g. print, copy and paste to another document), the forced data leakage prevention system may additionally prompt the processor 102 to execute a code instruction to display a warning to the user that the requested action (e.g. print, copy and paste to another document) is disallowed by policy. The process may then end.

Returning to block 510, if the code instructions generated by the supported third party application attempt to print the secure data, the forced data leakage prevention system in an embodiment may determine if the control policy associated with the user, the secure data that the secure third party application is attempting to copy and paste, and the secure third party application that is making the attempt allows for printing of the secured data. In some embodiments, the control policy may allow for printing of secured data (to hard copy and/or soft copy) if it is done so by a secured third party platform. In other embodiments, the control policy may not allow for such printing. Whether or not the control policy allows for such printing may be dependent upon the secured third party application attempting to perform such printing, the user operating the client machine within which the secured third party application is operating, the protection level associated with the secured data, or a combination of more than one of these factors. If the control policy associated with the user, the secure data that the secure third party application is attempting to copy and paste, and the secure third party application that is making the attempt allows for printing of the secured data in an embodiment, the method may proceed to block 512.

If the control policy associated with the third party application that is making the attempt does not allow for printing of the secured data in an embodiment, the method may proceed to block 506, and the forced data leakage preventions system may disallow the execution of the code instruction to print the secured data in any form, and display a warning to the user that the requested action is disallowed by policy. For example, in an embodiment described with reference to FIG. 3, if the injection client 136 operating the forced data leakage prevention system has disallowed execution of a code instruction from the secured third party application 312 to manipulate secure data (e.g. print, copy and paste to an unsecured document), the forced data leakage prevention system may additionally prompt the processor 102 to execute a code instruction to display a warning to the user that the requested action (e.g. print, copy and paste to an unsecured document) is disallowed by policy. In other embodiments, the control policy may allow for printing of the secure data to only hard copy, or to only specific types of soft copy (e.g. secured and encrypted pdf). In yet other embodiments, the control policy may allow for printing of the secure data with no limitations or restrictions of any kind, if requested by a secure third party application.

At block 512, if the control policy associated with the user, the secure data that the secure third party application is attempting to copy and paste, and the secure third party application that is making the attempt allows for printing of the secured data in an embodiment, the forced data leakage prevention system may inject code instructions to apply a digital watermark to the printed document into the original code instructions generated by the secured third party application prior to its execution. For example, in an embodiment described with reference to FIG. 3, a command from the secured third party application 312 to print secured data may be associated within the control policy 304 with a subset of code instructions operating to apply a digital watermark, the injection client 136 may inject the subset of code instructions operating to apply a digital watermark into the code instructions including the print command. In such an embodiment, when the processor is prompted to execute the original code instructions generated by the secured third party application 312, the processor 102 will first execute the subset of code instructions to apply a digital watermark to the printout, and then execute the code instructions including the print command. The digital watermark applied in an embodiment may identify the user of the client machine 302, the time at which the printout occurred, the secured third party application 312, or any combination of these identifiers for later use in auditing of secured data access. In other embodiments, the digital watermark may effectively redact or black out the secure data. The watermark may be a screen watermark overlaid on a digital representation of the secure data, or may be a print watermark overlaid on a printed representation of the secure data. In some embodiments, this block may be omitted, allowing the print to occur without addition of a watermark when the control policy allows for printing. The method may then end.

At block 512, if the third party application is attempting to paste secure data into a secure document, the forced data leakage prevention system in an embodiment may allow the processor to execute the code instructions originally generated by the secured third party application without modification or injection of a subset of further code instructions from the control policy. For example, in an embodiment described with reference to FIG. 3, the injection client 136 may not inject any subset of code instructions given in the control policy 304, and may leave the code instructions the injection client 136 moved prior to execution in the original form in which they were stored in the DLL associated with the supported third party application 312. The method may then end. In such a way, the forced data leakage prevention system in embodiments of the present disclosure may control access to individual items of secure data across by any current or later-developed third party application, regardless of which third party application attempts to manipulate the secure data, without development of a specific plugin for each third party application.

The blocks of flow diagrams 4-5 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a forced data leakage prevention system comprising:
    a processor executing code instructions of the forced data leakage prevention system to identify a monitored third party application on the information handling system operated by an identified user and identify a first dynamic link library address associated with the monitored third party application;
    the processor to retrieve a control policy associated with the third party application for monitoring and the identified user, wherein the control policy includes a subset of code instructions implementing leakage protection measures for a secure data set;
    the processor to detect a call from the monitored third party application to execute code instructions stored in a memory at the first dynamic link library address;
    the processor to move the code instructions stored at the first dynamic link library into a second library prior to execution of the code instructions stored at the first dynamic link library;
    an injection client operating via the processor to inject the subset of code instructions into the code instructions stored in the second library according to the control policy if the code instructions moved to the second library includes an operation on the secure data set; and
    the processor to move the code instructions stored in the second library including the injected subset of code instructions into the first dynamic link library.

2. The information handling system of claim 1, wherein the subset of code instructions includes code instructions to apply a digital watermark if the third party application is identified as a supported application and the operation on the secure data set includes a print command or a command to transform file data type.

3. The information handling system of claim 2, wherein the digital watermark identifies the user.

4. The information handling system of claim 1, wherein the subset of code instructions includes code instructions to:
    encrypt the secure data set prior to pasting if the third party application is identified as a supported application and the operation on the secure data set includes copying and pasting the secure data set into a secure document.

5. The information handling system of claim 1, wherein the subset of code instructions includes code instructions to:
    end the process described by the code instructions moved to the second library prior to the operation on the secure data set if the operation on the secure data set includes an operation disallowed by the control policy; and
    display a warning to the user that the requested action is disallowed by policy.

6. The information handling system of claim 5, wherein the third party application is identified as unsupported and the control policy disallows any operation on the secure data set.

7. The information handling system of claim 5, wherein the third party application is identified as supported and the control policy disallows copying and pasting the secure data set into an unsecure document or printing the secure data set.

8. A method of preventing secure data leakage comprising:
    receiving an indication an identified user has started a new user session;
    identifying a third party application for monitoring associated with the identified user in a memory, and a first dynamic link library address associated with the third party application for monitoring;
    identifying a control policy associated with the third party application for monitoring and the identified user in the memory, wherein the control policy includes a subset of code instructions associated with a secure data set;
    identifying a call to execute code instructions stored in the memory at the first dynamic link library address;
    prior to execution of the code instructions stored at the first dynamic link library, moving the code instructions stored at the first dynamic link library into a second library;
    if the code instructions moved to the second library includes an operation on the secure data set, injecting the subset of code instructions into the code instructions stored in the second library according to the control policy; and
    moving the code instructions stored in the second library including the injected subset of code instructions into the first dynamic link library.

9. The method of preventing secure data leakage of claim 8, wherein the subset of code instructions includes code instructions to apply a digital watermark if the third party application is identified as a supported application and the operation on the secure data set includes a print command.

10. The method of preventing secure data leakage of claim 9, wherein the digital watermark identifies the third party application.

11. The method of preventing secure data leakage of claim 8, wherein the subset of code instructions includes code instructions to encrypt the secure data set prior to pasting if the third party application is identified as a supported application and the operation on the secure data set includes copying and pasting the secure data set into a secure document.

12. The method of preventing secure data leakage of claim 8, wherein the subset of code instructions includes code instructions to end the process described by the code instructions moved to the second library prior to the operation on the secure data set if the operation on the secure data set includes an operation disallowed by the control policy and display a warning to the user that the requested action is disallowed by policy.

13. The method of preventing secure data leakage of claim 12, wherein the third party application is identified as unsupported and the control policy disallows any operation on the secure data set.

14. The method of preventing secure data leakage of claim 12, wherein the third party application is identified as supported and the control policy disallows copying and pasting the secure data set into an unsecure document or printing the secure data set.

15. An information handling system operating a forced data leakage prevention system comprising:
a processor executing code instructions of the forced data leakage prevention system to identify a monitored third party application on the information handling system operated by an identified user and identify a first dynamic link library address associated with the monitored third party application;
the processor to retrieve a control policy associated with the third party application for monitoring and the identified user, wherein the control policy includes a subset of code instructions implementing leakage protection measures for a secure data set;
the processor to detect a call from the monitored third party application to execute code instructions stored in a memory at the first dynamic link library address;
the processor to move the code instructions stored at the first dynamic link library into a second library prior to execution of the code instructions stored at the first dynamic link library;
an injection client operating via the processor to inject the subset of code instructions into the code instructions stored in the second library according to the control policy if the code instructions moved to the second library includes an operation on the secure data set;
wherein the subset of code instructions includes code instructions to end the process described by the code instructions moved to the second library prior to the operation on the secure data set and display a warning to the user that the requested action is disallowed by policy if the operation on the secure data set includes an operation disallowed by the control policy; and
the processor to move the code instructions stored in the second library including the injected subset of code instructions into the first dynamic link library.

16. The information handling system of claim 15, wherein the subset of code instructions includes code instructions to:
apply a digital watermark if the third party application is identified as a supported application and the operation on the secure data set includes a print command.

17. The information handling system of claim 16, wherein the digital watermark identifies a time of execution of the code instructions including the subset of code instructions stored at the first dynamic link library.

18. The information handling system of claim 15, wherein the subset of code instructions includes code instructions to:
encrypt the secure data set prior to pasting if the third party application is identified as a supported application and the operation on the secure data set includes copying and pasting the secure data set into a secure document.

19. The information handling system of claim 15, wherein the third party application is identified as unsupported and the control policy disallows any operation on the secure data set.

20. The information handling system of claim 15, wherein the third party application is identified as supported and the control policy disallows copying and pasting the secure data set into an unsecure document or printing the secure data set.

* * * * *